United States Patent
Sanders et al.

(10) Patent No.: US 9,354,063 B2
(45) Date of Patent: May 31, 2016

(54) SYSTEMS AND METHODS FOR PROVIDING INTENSITY STABILIZATION FOR A RESONATOR FIBER OPTIC GYROSCOPE

(71) Applicant: Honeywell International Inc., Morristown, NJ (US)

(72) Inventors: Glen A. Sanders, Scottsdale, AZ (US); Lee K. Strandjord, Tonka Bay, MN (US); Jianfeng Wu, Tucson, AZ (US); Tiequn Qiu, Glendale, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 98 days.

(21) Appl. No.: 14/266,356

(22) Filed: Apr. 30, 2014

(65) Prior Publication Data

US 2015/0316382 A1  Nov. 5, 2015

(51) Int. Cl.
*G01C 19/72* (2006.01)

(52) U.S. Cl.
CPC ............ *G01C 19/727* (2013.01); *G01C 19/721* (2013.01)

(58) Field of Classification Search
CPC .... G01C 19/72; G01C 19/721; G01C 19/727; G01C 19/00; G01C 19/64; G01C 19/722; G02F 1/2252; H01S 3/083
See application file for complete search history.

(56) References Cited

U.S. PATENT DOCUMENTS

| | | | |
|---|---|---|---|
| 5,048,961 A * | 9/1991 | Okamoto | G01C 19/72 356/463 |
| 5,627,644 A * | 5/1997 | Sanders | G01C 19/721 356/464 |
| 5,926,275 A | 7/1999 | Sanders et al. | |
| 6,351,310 B1 * | 2/2002 | Emge | G01C 19/721 356/460 |
| 7,855,789 B2 | 12/2010 | Strandjord et al. | |
| 8,294,900 B2 | 10/2012 | Strandjord et al. | |
| 2010/0002239 A1 * | 1/2010 | Strandjord | G01C 19/727 356/461 |
| 2010/0225923 A1 | 9/2010 | Strandjord et al. | |
| 2012/0050745 A1 | 3/2012 | Qiu et al. | |
| 2013/0057870 A1 | 3/2013 | Strandjord et al. | |

FOREIGN PATENT DOCUMENTS

EP            2698605         2/2014

OTHER PUBLICATIONS

Abbott et al., "Control System Design for the LIGO Pre-Stabilzed Laser", "8th International Conference on Accelerator & Large Experimental Physics Control Systems", 2001, pp. 361-363.
Nocera, "LIGO laser intensity noise suppression", Jul. 2003, pp. 1-15.

(Continued)

*Primary Examiner* — Tarifur Chowdhury
*Assistant Examiner* — Michael P Lapage
(74) *Attorney, Agent, or Firm* — Fogg & Powers LLC

(57) ABSTRACT

Systems and methods for an intensity stabilized resonator fiber optic gyroscope are provided. In one embodiment, a method for providing optical intensity stabilization system for a resonator fiber optic gyroscope (RFOG) is provided. The method comprises: injecting a phase modulated light beam into a fiber optic ring resonator coil; measuring a DC component of the phase modulated light beam at an output of the fiber optic ring resonator coil; generating a feedback control signal based on the DC component; and attenuating the phase modulated light beam prior to injection into the fiber optic ring resonator coil by controlling a variable optical attenuator with the feedback control signal.

11 Claims, 4 Drawing Sheets

(56) References Cited

OTHER PUBLICATIONS

Burns, "Precision Navigation Frade Fiber-Optic Gyroscope (FOG) with Noise Reduced Source", "Retrieved from Internet http://www.sbir.gov/sbirsearch/detail/270735", 2009, pp. 1-2.

European Patent Office, "Extended European Search Report from EP Application No. 15155291.6 mailed Sep. 10, 2015", "from Foreign Counterpart of U.S. Appl. No. 14/266,356", filed Sep. 10, 2015, pp. 1-7, Published in: EP.

* cited by examiner

SYSTEMS AND METHODS FOR PROVIDING INTENSITY STABILIZATION FOR A RESONATOR FIBER OPTIC GYROSCOPE

GOVERNMENT LICENSE RIGHTS

The U.S. Government may have certain rights in the present invention as provided for by terms of Government Contract No. HR0011-08-C-0019 with the Defense Advanced Research Projects Agency (DARPA).

BACKGROUND

The resonator fiber optic gyroscope (RFOG) is a promising contender for next generation navigation gyroscope. It has the potential to provide a navigation grade solution with the combination of low cost, small package size and weight. The RFOG uses at least two laser beams, at least one propagates around a resonator coil in the clockwise (CW) direction and the other in the counter-clockwise (CCW) direction. The RFOG can be operated under open loop and close loop configuration. One of the major issues with the RFOG is the bias instability which indicates some non-zero rate output even when the gyro is not under rotation. Under both open loop and close loop conditions, the gyro bias is affected by the intensity of the light circling inside of the gyro resonator coil. Optical intensity variations cause the instability in the indicated gyro rotation rate, thus are errors in its output, due to either Kerr effect or intensity-dependent bias offsets. The latter are due to intensity-dependent bias offsets in which the light waves in the resonator are not strictly locked to the center of the fiber resonator's resonance. When the intensity changes, these bias errors change their magnitude, thus giving rise to bias instability. The RFOG sensing resonator coil has a nonlinear response to the intensity of optical beams that propagate inside the coil arising from the optical Kerr Effect. The optical Kerr Effect is an intensity-dependent change in the refractive index of the fiber, which can shift the resonance frequency of the resonator in each direction.

For the reasons stated above and for other reasons stated below which will become apparent to those skilled in the art upon reading and understanding the specification, there is a need in the art for improved systems and methods for an Intensity Stabilized Resonator Fiber Optic Gyroscope.

SUMMARY

The Embodiments of the present invention provide methods and systems for an Intensity Stabilized Resonator Fiber Optic Gyroscope and will be understood by reading and studying the following specification.

Systems and methods for an intensity stabilized resonator fiber optic gyroscope are provided. In one embodiment, a method for providing optical intensity stabilization system for a resonator fiber optic gyroscope (RFOG) is provided. The method comprises: injecting a phase modulated light beam into a fiber optic ring resonator coil; measuring a DC component of the phase modulated light beam at an output of the fiber optic ring resonator coil; generating a feedback control signal based on the DC component; and attenuating the phase modulated light beam prior to injection into the fiber optic ring resonator coil by controlling a variable optical attenuator with the feedback control signal.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present disclosure utilize active feedback to control the optical power of light beams circulating inside the resonator (sensing) coil of a gyroscope. More specifically, embodiments presented herein measure the light intensity of a light beam exiting at the resonator coil transmission port as the sensing point for feedback control, in order to control the optical power inside the resonator coil that contributes to rotation rate measurements. These embodiments actively balance and stabilize the optical power inside the resonator coil so that rotation rate instability due to optical power fluctuation is greatly reduced or eliminated. In addition, most of the resonator fiber optic gyroscope configurations employ certain ways of phase modulation. The average intensity in the gyroscope's resonator will fluctuate inside the resonator with fluctuations in phase modulation amplitude, and those fluctuations are also addressed by the embodiments presented in this disclosure.

Figure 1:
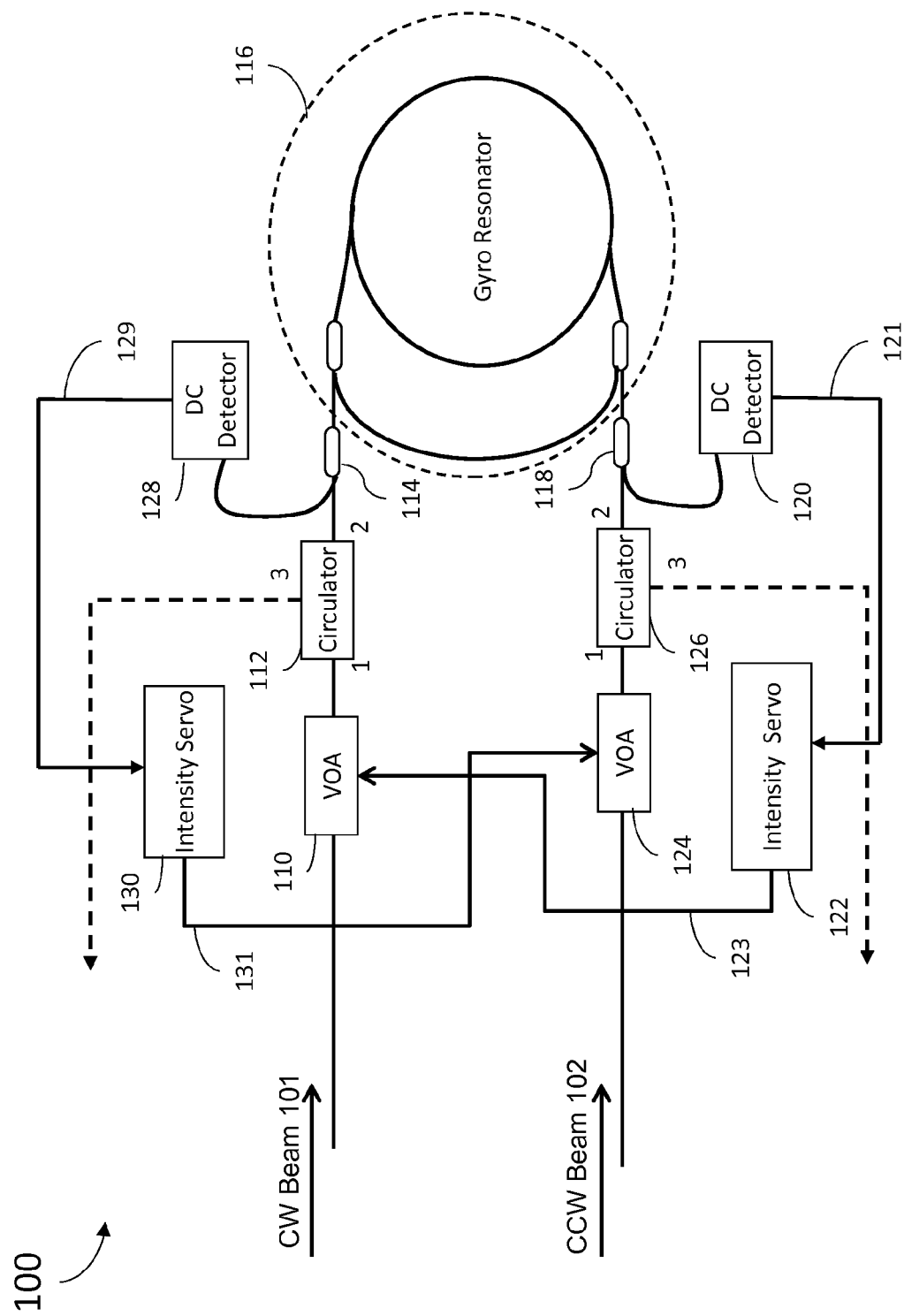
FIG. 1 is a diagram illustrating an optical intensity stabilization system for a resonator fiber optic gyroscope of one embodiment of the present disclosure.

FIG. 1 is a block diagram illustrating an optical intensity stabilization system 100 for a resonator fiber optic gyroscope (RFOG) of one embodiment of the present disclosure. System 100 comprises a fiber optic resonator ring 116 having a first end that receives a first phase modulated light beam 101. In one embodiment, the first light beam 101 may be modulated, for example, by a phase modulator coupled in series to a first laser light source. An opposing second end of fiber optic resonator ring 116 receives a second phase modulated light beam 102. In one embodiment, the second light beam 101 may be modulated by a phase modulator coupled in series to a second laser light source. Since each of the phase modulated light beams 101 and 102 enter opposite ends of resonator ring 116, they each travel through ring 116 in counter-propagating directions with respect to each other. For illustration purposes, in FIG. 1, the first light beam 101 is defined as traveling through ring 116 in the clock-wise (CW) direction, while the second light beam 102 is defined as traveling through ring 116 in the counter-clock-wise (CCW) direction. In some embodiments, the light for the first and second light beams may originate from a single light source whose output is split into the two beams 101 and 102.

With respect to controlling intensity of CW light beam 101, system 100 comprises a first variable optical attenuator (VOA) 110 coupled to a first circulator 112. CW light beam 101 passes into VOA 110, where it is attenuated based on a control signal from an intensity servo 122, as further explained below. The first optical light beam 101 exits VOA 110 into port 1 of circulator 112, and travels through circulator 112 exiting at port 2, at which point it is launched into the first end of resonator ring 116 via a polarization maintaining (PM) coupler 114.

With respect to controlling intensity of CW light beam 102, system 100 comprises a second variable optical attenuator (VOA) 124 coupled to a second circulator 126. CW light beam 102 passes into VOA 124, where it is attenuated based on a control signal from an intensity servo 130, as further explained below. The second optical light beam 102 exits VOA 124 into port 1 of circulator 126, and travels through circulator 126 exiting at port 2, from which point it is launched into the second end of resonator ring 116 via a polarization maintaining (PM) coupler 118.

In the embodiment shown in FIG. 1, the intensity of the CW and CCW beams 101 and 102 propagating through ring 116 can be directly measured by optical DC detectors 120 and 128 (respectively). More specifically, the CW light beam 101, after propagating around ring 116, will exit ring 116 and pass through polarization maintaining (PM) coupler 118, where a portion of that light is tapped out to optical DC detector 120. As the term is used herein, "optical DC" refers to an offset component of optical intensity that remain from a light beam after any alternating frequency components are removed. Coupler 118 being a PM coupler means that it will not alter the polarization state of light passing through it. Optical DC detector 120 converts the optical DC component of the transmitted CW light beam 101 into an electrical signal 121 which is fed back to intensity servo 122. From the feedback electrical signal 121, intensity servo 122 generates a control signal 123 to VOA 110. That is, from electrical signal 121, intensity servo 122 determines the error between a desired reference optical DC light intensity and the optical DC intensity measured by DC detector 120. The control signal 123 is varied to control that error (ideally driving the error to zero) by adjusting the attenuation applied by VOA 110 to the CW light beam 101 before it is launched into ring 116.

Similarly, the CCW light beam 102, after propagating around ring 116, will exit ring 116 and pass through PM coupler 114, where a portion of the light is tapped out to optical DC detector 128. Optical DC detector 128 converts the optical DC component of the transmitted CCW light beam 102 into an electrical signal 129 which is fed back to intensity servo 130. From the feedback electrical signal 129, intensity servo 130 generates a control signal 131 to VOA 124. Based on the DC intensity of CCW Beam 102 indicated by electrical signal 129, intensity servo 130 determines the error between a desired reference optical DC intensity of light within ring 116 and the optical DC intensity measured by DC detector 128. The control signal 131 is then varied to control that error (ideally driving the error to zero) by adjusting the attenuation applied by VOA 124 to the second light beam 102 before it is launched into ring 116. In this way, the optical intensity of light within resonator ring 116 is stabilized by using light exiting ring 116 as a feedback sensing point for optically attenuating light entering ring 116.

As mentioned above, couplers 114 and 118 are both polarization maintaining (PM) couplers. Circulators such as circulators 112 and 126 are typically polarizing elements. Environment temperature changes can inconsistently vary the polarization state of light traveling through fiber and PM components. Polarizing elements, such as circulators, only pass light with certain polarization state. As a result, the optical intensity will vary after passing through polarizing elements for the beams that has constant optical power but with a different or a varying polarization state. That is, as the respective light beams exit resonator ring 116 and enter port 2 of the respective circulators 112 and 126, they will travel through each circulator, exiting at port 3. While propagating through the circulators, the polarization states of beams 101 and 102 are altered. If the DC detection was performed on the beams exiting port 3 of the circulators, the light being measured would no longer be a sufficiently accurate representation of the light traveling through resonator ring 116. Tapping out the light beams 101, 102 upon exit from the resonator ring 116, and prior to their entry into the circulators 112, 126, provides a more accurate and consistent representation of light inside the resonator coil 116.

Figure 2:
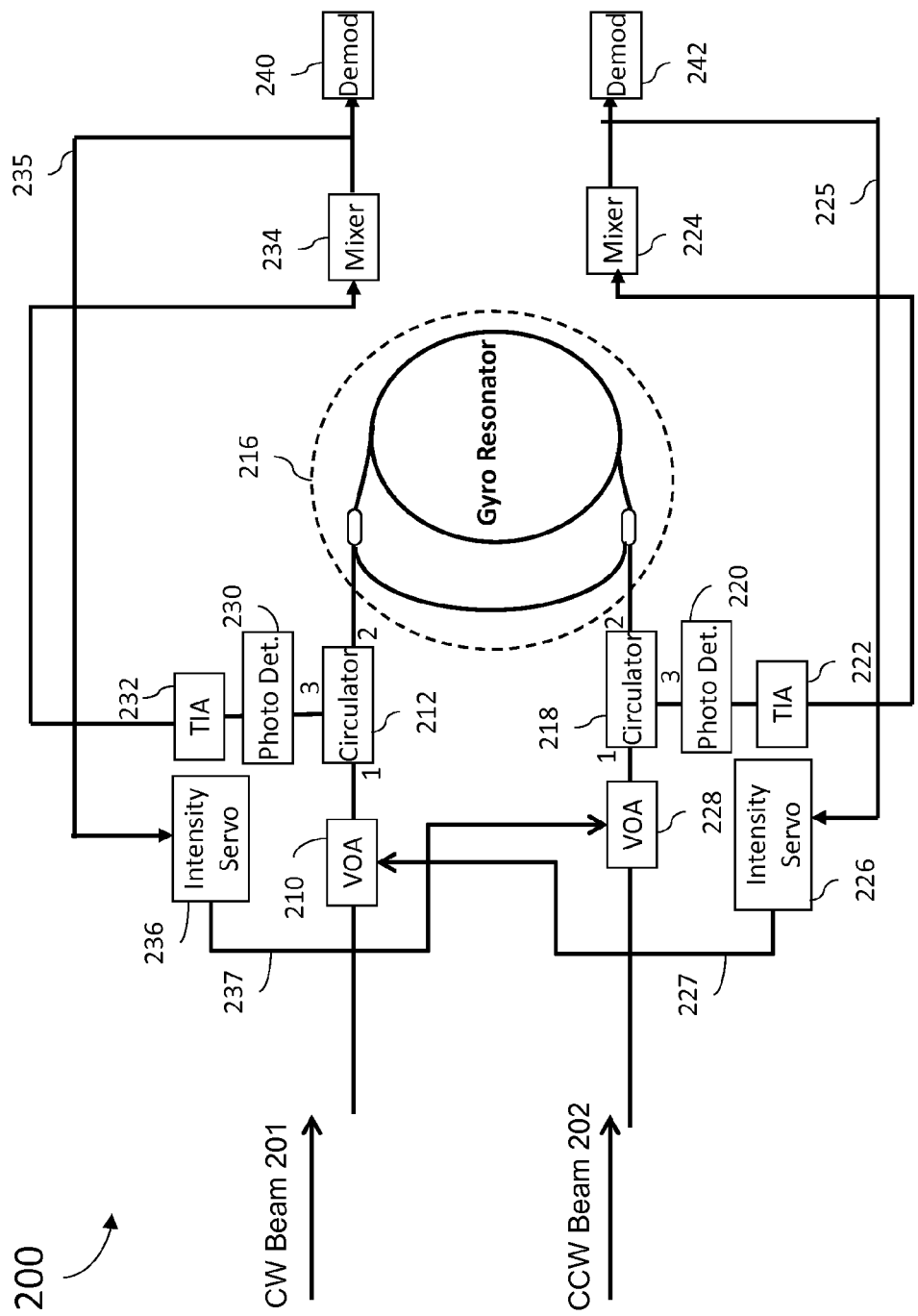
FIG. 2 is a diagram illustrating another optical intensity stabilization system for a resonator fiber optic gyroscope of one embodiment of the present disclosure.

FIG. 2 is a block diagram illustrating another optical intensity stabilization system 200 for a resonator fiber optic gyroscope (RFOG) of one embodiment of the present disclosure. Similar to system 100, system 200 comprises a fiber optic resonator ring 216 having a first end that receives a first (CW) light beam 201. In one embodiment, CW light beam 201 may be modulated by a phase modulator coupled in series to a first laser light source. An opposing second end of fiber optic resonator ring 216 receives a second (CCW) light beam 202. In one embodiment, the CCW light beam 202 is modulated by a phase modulator coupled in series to a second laser light source. Since each of the light beams 201 and 202 enter opposite ends of resonator ring 216, they each travel through ring 216 in counter-propagating directions with respect to each other. For illustration purposes, in FIG. 2, the first phase modulated light beam 201 is defined as traveling through ring 216 in the clock-wise (CW) direction, while the second phase modulated light beam 202 is defined as traveling through ring 216 in the counter-clock-wise (CCW) direction. In some embodiments, the light for the first and second phase modulated light beams may originate from a single light source whose output is split into the two beams 201 and 202.

In the embodiment shown in FIG. 2, a measurement of the light intensity of the CW and CCW phase modulated beams 201 and 202 as they are propagating through ring 216 is obtained using Sideband Heterodyne Detection (SHD).

With respect to controlling intensity of CW phase modulated light beam 201, system 200 comprises a first variable optical attenuator (VOA) 210 coupled to a first circulator 212. CW phase modulated light beam 201 passes into VOA 210, where it is attenuated based on a control signal from an intensity servo 226, as further explained below. The first optical light beam 201 exits VOA 210 into port 1 of circulator 212, and travels through circulator 112 exiting at port 2, at which point it is launched into the first end of resonator ring 216.

With respect to controlling intensity of CCW phase modulated light beam 202, system 200 comprises a second variable optical attenuator (VOA) 228 coupled to a second circulator 218. CCW phase modulated light beam 201 passes into VOA 228, where it is attenuated based on a control signal from an intensity servo 236, as further explained below. The CCW phase modulated light beam 202 exits VOA 228 into port 1 of circulator 218, and travels through circulator 218 exiting at port 2, at which point it is launched into the second end of resonator ring 216.

In the embodiment shown in FIG. 2, the intensity of the CW and CCW phase modulated light beams is measured after a demodulation. That is, the CW and CCW beams 101, 102 are each modulated at a high frequency that is comparable to the multiple plus half of the free spectral range (FSR) of the gyro resonator coil 216. The DC level indicated when the PM light beams are demodulated by mixers 224 and 234 at twice of the modulation frequency is an accurate indication for the light intensity for each optical beam inside resonator ring 216.

The CW PM light beam 201, after propagating around ring 216, will exit ring 216 and pass into port 2 of polarization maintaining (PM) circulator 218, from where it will be directed to output from port 3. Circulator 218 being a PM circulator means that it will not alter the polarization state of light passing through it and will not convert polarization variation into intensity noise. A photo detector 220 receives CW beam 201 exiting from port 3 of circulator 218, converting the optical intensity it measures into an electrical signal. That electrical signal is provided to a high frequency trans-impedance amplifier (TIA) 222. As utilized herein, TIA 222 functions as a rate detector providing a high frequency signal to Mixer 224. Mixer 224 is tuned to process signals from TIA 222 associated with a light beam of a specific phase modulation. That is, assuming CW PM beam 201 is phase modulated at a modulation frequency of $f_{m\_cw}$, mixer 224 is tuned to demodulate the electrical signal from TIA 222 at a frequency of twice the modulation frequency, or $2f_{m\_cw}$. For example, in one embodiment where CW beam 201 is being phase modulated at a modulation frequency of 4½ times the FSR of resonator coil 216, then mixer 224 is demodulating the electrical signal from TIA 222 at 9 times the FSR. The mixer 224 output comprises an electrical signal 225 having a DC component plus an alternating component. It is the DC output component from the mixer that provides a good indication of the light intensity inside the resonator coil 216 and is used to servo the VOA 210. The alternating component provides an indication of the CW beam frequency relative to the CW resonance center, and is thus used to determine rotation rate by being demodulated by a $2^{nd}$ demodulation device 242 (shown as "Demod" in FIG. 2). From the electrical signal 225 provided as feedback by mixer 224, intensity servo 226 generates a control signal 227 to VOA 210. That is, from the DC component of electrical signal 225, intensity servo 226 determines the error between a desired reference optical DC light intensity and the optical DC intensity measured in resonator coil 116. The control signal 227 is varied to control that error (ideally driving the error to zero) by adjusting the attenuation applied by VOA 210 to the CW phase modulated light beam 201 before it is launched into ring 216.

Meanwhile, the CCW phase modulated light beam 202, after propagating around ring 216, will exit ring 216 and pass into port 2 of polarization maintaining (PM) circulator 212, from where it will be directed to output from port 3. Circulator 212 being a PM circulator means that it will not alter the polarization state of light passing through it and will not convert polarization variation into intensity noise. A photo detector 230 receives CCW phase modulated beam 202 exiting from port 3 of circulator 212, converting the optical intensity it measures into an electrical signal. That electrical signal is provided to a high bandwidth trans-impedance amplifier (TIA) 232. As utilized herein, TIA 232 functions as a rate detector providing a high frequency signal to Mixer 234. Mixer 234 is tuned to process signals from TIA 232 associated with a light beam of a specific phase modulation. That is, assuming CWC PM beam 202 is phase modulated at a modulation frequency of $f_{m\_ccw}$, mixer 234 is tuned to demodulate the electrical signal from TIA 232 at a frequency of twice the modulation frequency, or $2f_{m\_ccw}$. For example, in one embodiment where CWC PM beam 202 is being phase modulated at a modulation frequency of 4½ times the FSR of resonator coil 216, then mixer 234 is demodulating the electrical signal from TIA 232 at 9 times the FSR. The mixer 234 output comprises an electrical signal 235 having a DC component plus an alternating component. It is the DC output component from the mixer that provides a good indication of the light inside the resonator coil 216 and is used to servo the VOA 228. The alternating component provides an indication of the CCW beam frequency relative to the CCW resonance center, and is thus used to determine rotation rate by being demodulated by a $2^{nd}$ demodulation device 240 (shown as "Demod" in FIG. 2). From the electrical signal 235 provided as feedback by mixer 234, intensity servo 236 generates a control signal 237 to VOA 238. That is, from the DC component of electrical signal 235, intensity servo 236 determines the error between a desired reference optical DC light intensity and the optical DC intensity measured in resonator coil 116. The control signal 237 is varied to control that error (ideally driving the error to zero) by adjusting the attenuation applied by VOA 228 to the CCW PM light beam 202 before it is launched into ring 216.

As mentioned above, mixers 224 and 234 each will only look at a certain beam of a certain phase modulation so that using such mixers, the approach illustrated in FIG. 2 can be applied to precisely control a specific beam when there are two (or more) phase modulated beams travelling through resonator 216 in the same direction. This configuration helps to distinguish the optical power level of different input beams in the same direction, since each beam will have a different phase modulation applied to it.

Figure 3:
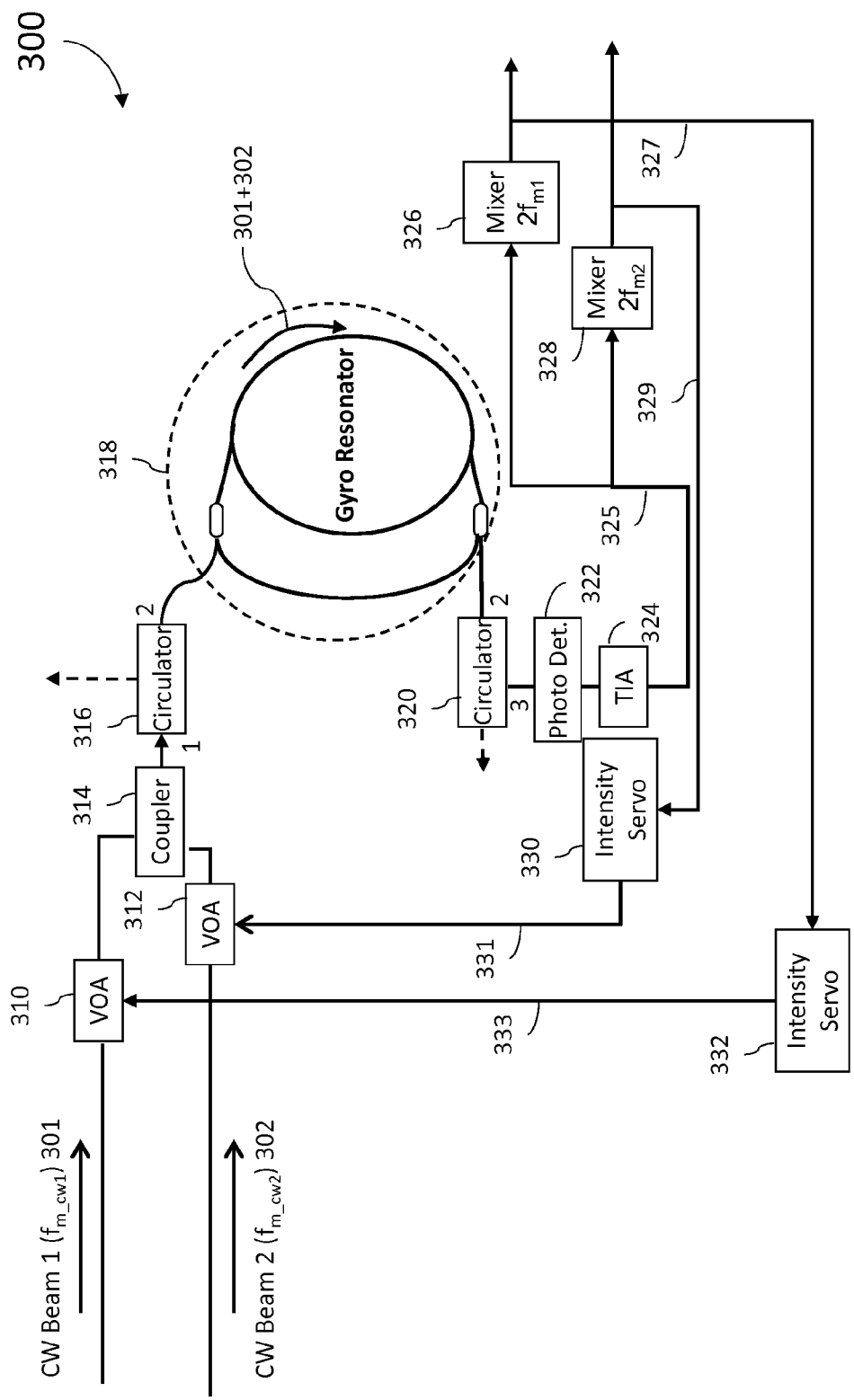
FIG. 3 is a diagram illustrating another optical intensity stabilization system for a resonator fiber optic gyroscope of one embodiment of the present disclosure.

One such implementation is shown in FIG. 3 which illustrates a plurality of CW phase modulated beams 301 and 302 travelling in same direction around resonator coil 318. It should be understood that in FIG. 3, controlling of the CW phase modulated beams 301 and 302, respectively, are illustrated for the sake of simplicity and that a plurality of CCW phase modulated beams may be controlled in the same manner as described for the CW phase modulated beams. CW phase modulated beams 301 and 302 each have a different phase modulation applied. For example, in one embodiment, CW phase modulated beam 301 is phase modulated at a modulation frequency, $f_{m\_cw1}$, while CW phase modulated beam 302 is phase modulated at a modulation frequency, $f_{m\_cw2}$.

With respect to controlling intensity of CW phase modulated light beam 301, system 300 comprises a first variable optical attenuator (VOA) 310 coupled to an optical coupler 314. CW phase modulated light beam 301 passes into VOA 310, where it is attenuated based on a control signal from an intensity servo 332, as further explained below. The first optical light beam 301 exits VOA 310 into optical coupler 314. With respect to controlling intensity of CW PM light beam 302, system 300 comprises a second variable optical attenuator (VOA) 312 also connected to optical coupler 314. CW phase modulated light beam 302 passes into VOA 312, where it is attenuated based on a control signal from an intensity servo 330, as further explained below. The second optical light beam 302 exits VOA 312 into optical coupler 314. At that point, optical coupler 314 combines the optical light beams 301 and 302 into a single CW beam 301+302 which it outputs into port 1 of circulator 316. The CW beam travels through circulator 316 exiting at port 2, at which point it is launched into the first end of resonator ring 318.

The CW PM light beam 301+302, after propagating around ring 318, will exit and pass into port 2 of polarization maintaining (PM) circulator 320, from where it will be directed to output from port 3. Circulator 320 being a PM circulator means that it will not alter the polarization state of light passing through it and will not convert polarization variation into intensity noise. A photo detector 322 receives CW beam 301+302 exiting from port 3 of circulator 320, converting the optical intensity it measures into an electrical signal. That electrical signal is provided to a trans-impedance amplifier (TIA) 324. The output 325 of TIA 324 will include components associated with each of the CW phase modulated light beams 301 and 302.

In this embodiment, mixer 326 is tuned to process signals from TIA 324 associated with CW phase modulated beam 301. That is, assuming CW phase modulated beam 301 is phase modulated at a modulation frequency of $f_{m1}$, mixer 326 is tuned to demodulate the electrical signal from TIA 324 at a frequency of twice the modulation frequency, or $2f_{m1}$. The mixer 326 output comprises an electrical signal 327 having a DC component plus an alternating component. The DC output component from the mixer 326 provides a good indication of the intensity of CW phase modulated beam 301 inside the resonator coil 318 and is used to servo the VOA 310. From the electrical signal 327 provided as feedback by mixer 326, intensity servo 332 generates a control signal 333 to VOA 310. From the DC component of electrical signal 327, intensity servo 332 determines the error between a desired reference optical DC light intensity and the optical DC intensity on CW phase modulated beam 301 measured in resonator coil 318. The control signal 333 is varied to control that error (ideally driving the error to zero) by adjusting the attenuation applied by VOA 310 to the CW phase modulated light beam 301 before it is launched into ring 318.

Meanwhile, mixer 328 is tuned to process signals from TIA 324 associated with CW phase modulated beam 302. That is, assuming CW phase modulated beam 302 is phase modulated at a modulation frequency of $f_{m2}$, mixer 328 is tuned to demodulate the electrical signal from TIA 324 at a frequency of twice the modulation frequency, or $2f_{m2}$. The mixer 328 output comprises an electrical signal 329 having a DC component plus an alternating component. The DC output component from the mixer 328 provides a good indication of the intensity of CW phase modulated beam 302 inside the resonator coil 318 and is used to servo the VOA 312. From the electrical signal 329 provided as feedback by mixer 328, intensity servo 330 generates a control signal 331 to VOA 312. From the DC component of electrical signal 329, intensity servo 330 determines the error between a desired reference optical DC light intensity and the optical DC intensity on CW phase modulated beam 302 measured in resonator coil 318. The control signal 331 is varied to control that error (ideally driving the error to zero) by adjusting the attenuation applied by VOA 312 to the CW phase modulated light beam 302 before it is launched into ring 318.

In this way, embodiments such as shown in FIG. 3, may provide intensity stabilization for a plurality of light beams travelling in same direction around a resonator coil by controlling the optical attenuation of each beam individually before they are launched into the resonator coil.

In any of the configurations described above, a measurement representing DC intensity is sent to a feedback servo which controls variable optical attenuators (VOAs) that are in front of gyroscope. The VOAs are used to adjust the input beam intensity. For some embodiments, there is one VOA for each input beam. The intensity stabilized provided by these embodiments results in an RFOG where the optical Kerr effect or intensity-dependent bias offsets have been appreciably reduced or eliminated, thus improving the bias stability of the gyro output.

Figure 4:
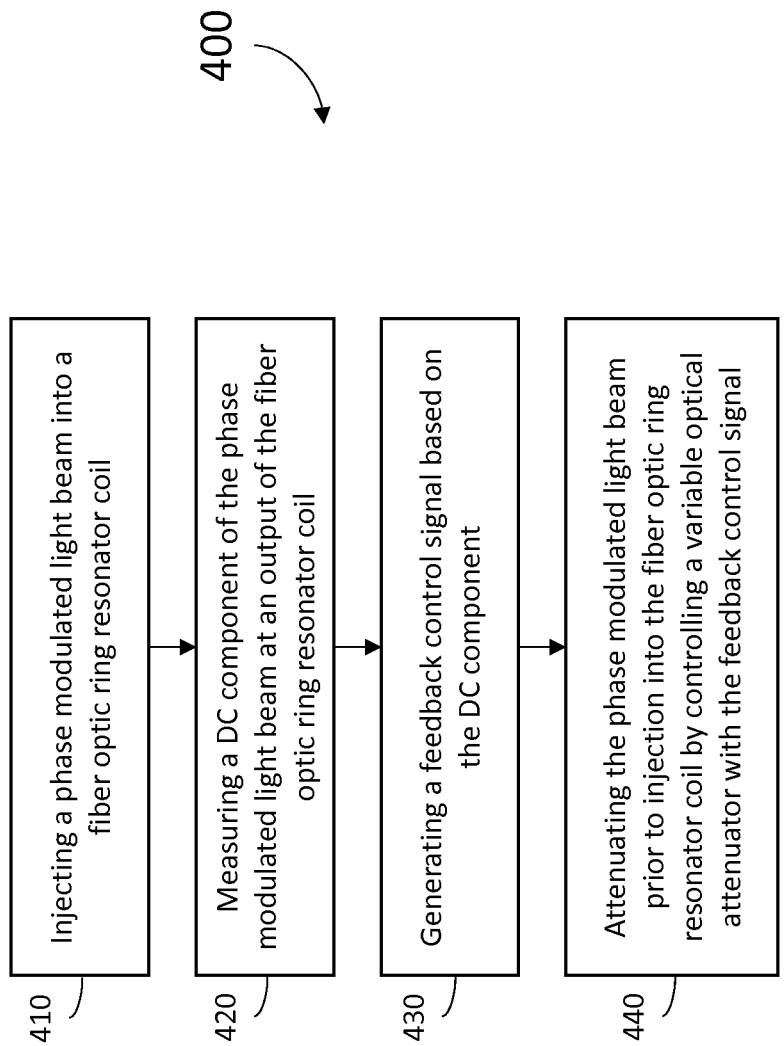
FIG. 4 is a flow chart illustrating a method for optical intensity stabilization for a resonator fiber optic gyroscope of one embodiment of the present disclosure.

FIG. 4 is a flow chart illustrating a method of one embodiment of the present invention. The method begins at 410 with injecting a phase modulated light beam into a fiber optic ring resonator coil and proceeds to 420 with measuring a DC component of the phase modulated light beam at the output of the fiber optic ring resonator coil. In one embodiment, such as with the system shown in FIG. 1, the method at 420 may comprise tapping the output of the fiber optic ring resonator coil using a PM coupler and sending that light beam to a DC detector. The DC detector will output an electrical signal that is a function of the intensity of the optical DC component of the phase modulated light beam at the output of the fiber optic ring resonator coil. In other embodiments, such as shown in FIGS. 2 and 3, the method at 420 may comprise applying the output of the fiber optic ring resonator coil to a photo detector. The photo detector outputs an electrical signal that varies as a function of the total light beam intensity. This electrical signal is applied to a trans-impedance amplifier, whose output is demodulated at a frequency that is twice the frequency of the phase modulation of the light beam. The resulting output will include an electrical signal that is a function of the intensity of the optical DC component of the phase modulated light beam, as described above. The method then proceeds to 430 with generating a feedback control signal based on the DC component. In one embodiment, from the measured DC component an intensity servo can determine the error between a desired reference optical DC light intensity and the optical DC intensity of the phase modulated light beam measured from the output of the resonator coil. A feedback control signal generated by the intensity servo is varied to control that error (ideally driving the error to zero) by adjusting a attenuation applied to the phase modulated light beam before it is launched into the fiber optic ring resonator coil. Accordingly, the method proceeds to 440 with attenuating the phase modulated light beam prior to injection into the fiber optic ring resonator coil by controlling a variable optical attenuator with the feedback control signal.

EXAMPLE EMBODIMENTS

Example 1 includes an optical intensity stabilization system for a resonator fiber optic gyroscope (RFOG), the system comprising: a first variable optical attenuator configured to receive a first phase modulated light beam, wherein the first phase modulated light beam is phase modulated at a first modulation frequency, $f_{m1}$; a second variable optical attenuator configured to receive a second phase modulated light beam, wherein the second phase modulated light beam is phase modulated at a second modulation frequency, $f_{m2}$; a resonator ring coupled to receive the first phase modulated light beam from the first variable optical attenuator, and coupled to receive the second phase modulated light beam from the second variable optical attenuator; a first intensity servo electrically coupled to the first variable optical attenuator, wherein the first intensity servo controls an attenuation applied by the first variable optical attenuator on the first phase modulated light beam based on an optical DC component of the first phase modulated light beam as measured from a first output of the resonator ring; and a second intensity servo electrically coupled to the second variable optical attenuator, wherein the second intensity servo controls an attenuation applied by the second variable optical attenuator on the second phase modulated light beam based on an optical DC component of the second phase modulated light beam as measured from a second output of the resonator ring.

Example 2 includes the system of Example 1, wherein the resonator ring inputs the first phase modulated light beam at a first end of the resonator ring and inputs the second phase modulated light beam at a second end of the resonator ring such that the first phase modulated light beam and the second phase modulated light beam are counter propagating within the resonator ring.

Example 3 includes the system of any of Examples 1-2, wherein the resonator ring inputs the first phase modulated light beam and the second phase modulated light beam at a first end of the resonator ring such that the first phase modulated light beam and the second phase modulated light beam are propagating within the resonator ring in the same direction.

Example 4 includes the system of any Example 3, wherein the first output and the second output comprise the same output.

Example 5 includes the system of any of Examples 1-4, further comprising a first DC detector optically coupled to the first output of the ring resonator by a first polarization maintaining (PM) optical coupler and electrically coupled to the first intensity servo; wherein the first DC detector outputs an electrical signal to the first intensity servo that varies as a function of the optical DC component of the first phase modulated light beam as measured from the first output of the resonator ring.

Example 6 includes the system of any of Examples 1-5, further comprising a second DC detector optically coupled to the second output of the ring resonator by a second polarization maintaining (PM) optical coupler and electrically coupled to the second intensity servo; wherein the second DC detector outputs an electrical signal to the second intensity servo that varies as a function of the optical DC component of the second phase modulated light beam as measured from the second output of the resonator ring.

Example 7 includes the system of any of Examples 1-6, further comprising: a first photo detector optically coupled to the first output of the ring resonator by a first polarization maintaining (PM) optical circulator; a first trans-impedance amplifier coupled to the first photo detector; and a first mixer coupled to the first trans-impedance amplifier and the first intensity servo; wherein the first mixer outputs an electrical signal to the first intensity servo that varies as a function of the optical DC component of the first phase modulated light beam as measured by the first photo detector.

Example 8 includes the system of Example 7, wherein the first mixer demodulates a signal from the first trans-impedance amplifier at $2f_{m1}$, twice the first modulation frequency, to generate the electrical signal to the first intensity servo.

Example 9 includes the system of any of Examples 7-8, further comprising: a second photo detector optically coupled to the second output of the ring resonator by a second polarization maintaining (PM) optical circulator; a second trans-impedance amplifier coupled to the second photo detector; and a second mixer coupled to the second trans-impedance amplifier and the second intensity servo; wherein the second mixer outputs an electrical signal to the second intensity servo that varies as a function of the optical DC component of the second phase modulated light beam as measured by the second photo detector.

Example 10 includes the system of Example 9, wherein the second mixer demodulates a signal from the second trans-impedance amplifier at $2f_{m2}$, twice the second modulation frequency, to generate the electrical signal to the second intensity servo.

Example 11 includes the system of any of Examples 7-10, further comprising a second mixer coupled to the first trans-impedance amplifier and the second intensity servo; wherein the second mixer outputs an electrical signal to the second intensity servo that varies as a function of the optical DC component of the second phase modulated light beam as measured by the first photo detector.

Example 12 includes the system of any Example 11, wherein the second mixer demodulates the signal from the first trans-impedance amplifier at $2f_{m2}$, twice the second modulation frequency, to generate the electrical signal to the second intensity servo.

Example 13 includes the system of any of Examples 1-12, wherein the first intensity servo determines a first error between a desired reference optical DC light intensity and the optical DC component as measured from the first output of the resonator ring, and wherein the first intensity servo controls the attenuation applied by the first variable optical attenuator to drive the first error towards zero; and wherein the second intensity servo determines a second error between a desired reference optical DC light intensity and the optical DC component as measured from the second output of the resonator ring, and wherein the second intensity servo controls the attenuation applied by the second variable optical attenuator to drive the second error towards zero.

Example 14 includes a method for providing optical intensity stabilization system for a resonator fiber optic gyroscope (RFOG), the method comprising: injecting a phase modulated light beam into a fiber optic ring resonator coil; measuring a DC component of the phase modulated light beam at an output of the fiber optic ring resonator coil; generating a feedback control signal based on the DC component; and attenuating the phase modulated light beam prior to injection into the fiber optic ring resonator coil by controlling a variable optical attenuator with the feedback control signal.

Example 15 includes the method of Example 14, wherein measuring the DC component of the phase modulated light beam further comprises: tapping the output of the fiber optic ring resonator coil using a PM coupler; and sending the output of the fiber optic ring resonator coil to a DC detector; wherein the DC detector outputs an electrical signal that is a function of the intensity of the optical DC component of the phase modulated light beam.

Example 16 includes the method of any of Examples 14-15, wherein measuring the DC component of the phase modulated light beam further comprises: converting the an output of the fiber optic ring resonator coil into a first electrical signal that varies as a function of light beam intensity; applying the first electrical signal to a trans-impedance amplifier; and demodulating the first electrical signal at a frequency that is twice the frequency of the phase modulation of the light beam to produce a second electrical signal that is a function of the intensity of the optical DC component of the phase modulated light beam.

Example 17 includes the method of any of Examples 14-16, wherein generating the feedback control signal based on the DC component further comprises: determining an error between a desired reference optical DC light intensity and the intensity of the optical DC component indicated by the second electrical signal.

Example 18 includes the method of Examples 17, further comprising varying the feedback control signal to drive the error to zero.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. An optical intensity stabilization system for a resonator fiber optic gyroscope (RFOG), the system comprising:
    a first variable optical attenuator configured to receive a first phase modulated light beam, wherein the first phase modulated light beam is phase modulated at a first modulation frequency, $f_{m1}$;
    a second variable optical attenuator configured to receive a second phase modulated light beam, wherein the second phase modulated light beam is phase modulated at a second modulation frequency, $f_{m2}$;
    a resonator ring coupled to receive the first phase modulated light beam from the first variable optical attenuator, and coupled to receive the second phase modulated light beam from the second variable optical attenuator;
    a first intensity servo electrically coupled to the first variable optical attenuator, wherein the first intensity servo controls an attenuation applied by the first variable optical attenuator on the first phase modulated light beam based on an optical DC component of the first phase modulated light beam as measured by a first DC detector from a first output of the resonator ring; and
    a second intensity servo electrically coupled to the second variable optical attenuator, wherein the second intensity servo controls an attenuation applied by the second variable optical attenuator on the second phase modulated light beam based on an optical DC component of the second phase modulated light beam as measured by a second DC detector from a second output of the resonator ring.

2. The system of claim 1, wherein the resonator ring inputs the first phase modulated light beam at a first end of the resonator ring and inputs the second phase modulated light beam at a second end of the resonator ring such that the first phase modulated light beam and the second phase modulated light beam are counter propagating within the resonator ring.

3. The system of claim 1, wherein the first detector is optically coupled to the first output of the ring resonator by a first polarization maintaining (PM) optical coupler and electrically coupled to the first intensity servo;
    wherein the first DC detector outputs an electrical signal to the first intensity servo that varies as a function of the optical DC component of the first phase modulated light beam as measured from the first output of the resonator ring.

4. The system of claim 3, wherein the second detector is optically coupled to the second output of the ring resonator by a second polarization maintaining (PM) optical coupler and electrically coupled to the second intensity servo;
    wherein the second DC detector outputs an electrical signal to the second intensity servo that varies as a function of the optical DC component of the second phase modulated light beam as measured from the second output of the resonator ring.

5. The system of claim 1, further comprising:
    a first photo detector optically coupled to the first output of the ring resonator by a first polarization maintaining (PM) optical circulator;
    a first trans-impedance amplifier coupled to the first photo detector; and
    a first mixer coupled to the first trans-impedance amplifier and the first intensity servo;
    wherein the first mixer outputs an electrical signal to the first intensity servo that varies as a function of the optical DC component of the first phase modulated light beam as measured by the first photo detector.

6. The system of claim 5, wherein the first mixer demodulates a signal from the first trans-impedance amplifier at $2f_{m1}$, twice the first modulation frequency, to generate the electrical signal to the first intensity servo.

7. The system of claim 5, further comprising:
    a second photo detector optically coupled to the second output of the ring resonator by a second polarization maintaining (PM) optical circulator;
    a second trans-impedance amplifier coupled to the second photo detector; and
    a second mixer coupled to the second trans-impedance amplifier and the second intensity servo;
    wherein the second mixer outputs an electrical signal to the second intensity servo that varies as a function of the optical DC component of the second phase modulated light beam as measured by the second photo detector.

8. The system of claim 7, wherein the second mixer demodulates a signal from the second trans-impedance amplifier at $2f_{m2}$, twice the second modulation frequency, to generate the electrical signal to the second intensity servo.

9. The system of claim 5, further comprising a second mixer coupled to the first trans-impedance amplifier and the second intensity servo;
    wherein the second mixer outputs an electrical signal to the second intensity servo that varies as a function of the optical DC component of the second phase modulated light beam as measured by the first photo detector.

10. The system of claim 9, wherein the second mixer demodulates the signal from the first trans-impedance amplifier at $2f_{m2}$, twice the second modulation frequency, to generate the electrical signal to the second intensity servo.

11. The system of claim 1, wherein the first intensity servo determines a first error between a desired reference optical DC light intensity and the optical DC component as measured from the first output of the resonator ring, and wherein the first intensity servo controls the attenuation applied by the first variable optical attenuator to drive the first error towards zero; and
    wherein the second intensity servo determines a second error between a desired reference optical DC light intensity and the optical DC component as measured from the second output of the resonator ring, and wherein the second intensity servo controls the attenuation applied by the second variable optical attenuator to drive the second error towards zero.

* * * * *